US011443387B2

(12) United States Patent
Browne et al.

(10) Patent No.: US 11,443,387 B2
(45) Date of Patent: Sep. 13, 2022

(54) AUTOMATED IDENTIFICATION OF DUPLICATE INFORMATION OBJECTS

(71) Applicant: Optum Services (Ireland) Limited, Dublin (IE)

(72) Inventors: Gillian S. Browne, County Dublin (IE); Ryan A. Hines, Spring Hill, KS (US); Sergio Moreno Gonzalez, San Antonio, TX (US); Diarmuid Keating, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 30 days.

(21) Appl. No.: 17/030,531

(22) Filed: Sep. 24, 2020

(65) Prior Publication Data

US 2022/0092699 A1    Mar. 24, 2022

(51) Int. Cl.
*G06Q 40/08*      (2012.01)
*G06F 16/2455*    (2019.01)
*G06F 16/22*      (2019.01)

(52) U.S. Cl.
CPC ......... *G06Q 40/08* (2013.01); *G06F 16/2237* (2019.01); *G06F 16/24566* (2019.01)

(58) Field of Classification Search
None
See application file for complete search history.

(56) References Cited

U.S. PATENT DOCUMENTS

| 8,898,798 | B2 | 11/2014 | Rogers et al. |
| 10,552,576 | B2 | 2/2020 | Campbell |
| 2013/0262154 | A1* | 10/2013 | Whittier ................. G06Q 40/08 705/4 |
| 2019/0095999 | A1 | 3/2019 | Li et al. |
| 2019/0378094 | A1 | 12/2019 | Quinn |
| 2020/0013124 | A1 | 1/2020 | Obee et al. |

(Continued)

OTHER PUBLICATIONS

Chandola, Varun et al. "Knowledge Discovery From Massive Healthcare Claims Data," In Proceedings of the 19th ACM SIGKDD International Conference On Knowledge Discovery and Data Mining, Aug. 2013, pp. 1312-1320. DOI: 10.1145/2487575.2488205.

(Continued)

*Primary Examiner* — Joseph W. King
(74) *Attorney, Agent, or Firm* — Alston & Bird LLP

(57) ABSTRACT

Systems and methods are configured to determine whether a particular information object is a duplicate of an object found in separate information objects. In various embodiments, the particular information object and each separate information object includes a set of data fields for storing data values that allows identical values to be stored in different fields for the objects. The data values for the particular information object are combined to form a data structure that includes a data element for each value. A determination as to whether the particular information object is an exact or partial match of a separate information object is made by performing a function on the data structure for the particular information object and a data structure for the separate information object to identify an intersection that includes data values for the particular information object that have an identical match with values for the separate information object.

24 Claims, 7 Drawing Sheets

(56) References Cited

U.S. PATENT DOCUMENTS

2021/0224258 A1* 7/2021 Faruquie ............ G06F 16/2358

OTHER PUBLICATIONS

Li, Jing et al. "A Survey On Statistical Methods For Health Care Fraud Detection," Health Care Manage Science, vol. 11, No. 3, Sep. 1, 2008, (14 pages). DOI: 10.1007/s10729-007-9045-4.
Sukumar, Sreenivas R. et al. "Quality of Big Data in Healthcare," International Journal Of Health Care Quality Assurance, vol. 28, Issue 6, Jul. 13, 2015, (14 pages). DOI:10.1108/IJHCQA-07-2014-0080. ISSN: 0952-6862.

* cited by examiner

AUTOMATED IDENTIFICATION OF DUPLICATE INFORMATION OBJECTS

TECHNOLOGICAL FIELD

Embodiments of the present invention generally relate to automatically identifying duplicate information objects in collections of data.

BACKGROUND

Electronic data interchange (EDI) is commonly used in a variety of industries and involves the digital exchange of business documents between companies using computers. Standard documents typically exchanged through EDI include purchase orders, invoices, shipping documents, and/ or the like. Accordingly, the goal of EDI is to provide a computer-to-computer exchange, without the need for any manual input. This is because when humans intervene in a communication process, the process is inevitably slowed, and the risk of error is increased.

In addition, EDI dramatically simplifies the exchange between parties. For example, when the exchange involves a purchase order, a buyer's internal system can make use of EDI to send a purchase order, and the supplier's internal system can accept the order in real-time without the need for faxing, mailing, or manual entry. This automated exchange between computer systems allows for much faster and more accurate transactions between businesses, where speed can be a necessity to successfully run the businesses.

However, a common problem that can occur is when duplicate documents are submitted (duplicate submissions) using EDI. For example, in the insurance industry, duplicate claim submissions performed electronically can lead to insurance companies processing these duplicate claims, resulting in payouts of benefits that are incorrect. Thus, effective duplicate claim identification is essential to avoiding unnecessary cost for insurance companies.

However, the arrangement of information found within electronic documents submitted using EDI can vary greatly from company to company. Therefore, the information is not always populated in a standard manner. As a result, the varying position of information found in many EDI submissions complicates matching new submissions to older (e.g., historical) submissions. This problem can even be magnified when EDI submissions account for a large volume of data.

For instance, returning to the example of the insurance industry, although insurance companies are required to comply with a standard format, certain information can change position within the format from claim to claim. For example, the information submitted for an insurance claim may include one or more diagnosis codes (e.g., ICD-10 codes) used to identify medical diagnoses and help insurance companies understand why the care provided to a claimant was necessary. Many times, they work in tandem with modifiers and are required on every claim submission. However, the diagnosis codes can be provided in any combination across a number of positions (e.g., fields) used within an EDI submission of a claim and there can be up to twenty-five codes provided on a single claim. Therefore, these codes can appear in different positions or can repeat across positions. The rigidity of the standard format combined with the variation of information creates a need to match across positions, causing a combinatorics problem.

Accordingly, investigations to identify duplicates often involve manual processes. These manual processes are regularly time-consuming and error prone due to the volume of EDI submissions that may need to be reviewed and variation in duplicate scenarios that can be found within the submissions. Therefore, a need exists in the industry for improved automated systems and methods for identifying and investigating duplicate EDI submissions, as well as other duplicate information objects. It is with respect to these considerations and others that the disclosure herein is presented.

BRIEF SUMMARY

In general, embodiments of the present invention provide methods, apparatus, systems, computing devices, computing entities, and/or the like for determining whether a particular information object is a duplicate of a separate information object found in a plurality of separate information objects. Here, an information object may describe an item on which an analysis is performed. For instance, in particular embodiments, the particular information object may be an electronic record of a recently submitted insurance claim used in conducting an analysis to determine whether the claim may be a duplicate of a previously submitted insurance claim.

In various embodiments, the particular information object and each of the plurality of separate information objects includes a set of data fields for storing a set of data values that allows an identical data value in the set of data values to be stored in different data fields for the particular information object and the plurality of separate information objects. The set of data values stored in the set of data fields for each separate information object is combined to form a data structure that includes a data element for each data value found in the set of data values. Similarly, the set of data values stored in the set of data fields for the particular information object are combined to form a data structure that includes a data element for each data value found in the set of data values. For example, in some embodiments, the data structure is an array or a linked list.

One or more iterations may then be performed to determine whether the particular information object matches one or more of the plurality of separate information objects. Here, an iteration may be carried out by performing a function on the data structure for the particular information object and the data structure for one of the plurality of separate information objects to identify an intersection that includes data values in the set of data values for the particular information object that have identical matches with data values in the set of data values for the separate information object.

Accordingly, the particular information object may be determined to be an exact match of the separate information object based at least in part on the intersection including each of the data values in the set of data values for the particular information object. While the particular information object may be determined to be a partial match of the separate information object based at least in part on the intersection having one or more of the data values in the set of data values for the particular information object, but less than all the data values. In particular embodiments, the particular information object may be determined to be an exact match or a partial match based in addition on data values stored in one or more additional data fields not found in the set of data fields for the particular information object matching data values stored in one or more additional data fields not found in the set of data fields for the separate information object.

In particular embodiments, an automated action may be carried out as a result of determining the particular information object is an exact match or a partial match of the separate information object. For example, in some embodiments, the automated action may be having the particular information object identified as a partial match of the separate information object on an investigatory user interface. While in some embodiments, the automated action may be having the particular information object and/or the separate information object updated via an Application Programming Interface (API).

In some instances, the particular information object may represent a particular insurance claim. Here in particular embodiments, the automated action may be having the particular insurance claim denied upon determining the particular insurance claim is an exact match of a separate insurance claim. In other embodiments, the automated action may be determining whether the claimant for the particular insurance claim has additional insurance coverage and adjusting the liability on a separate insurance claim upon determining the particular insurance claim is an exact match of the separate insurance claim and the claimant has additional insurance coverage. While in other embodiments, the automated action may be determining whether a medical procedure associated with the particular insurance claim is a type of medical procedure that can be reimbursed more than once a day upon determining the particular insurance claim is an exact match of a separate insurance claim. Finally, in particular embodiments, the particular insurance claim to be allowed to process normally in response to the particular claim not being an exact or partial match with any of the separate insurance claims.

In accordance with one aspect of the present disclosure, a computer-implemented method is provided for determining whether a particular information object is a duplicate of a separate information object found in a plurality of separate information objects in which the particular information object and each of the plurality of separate information objects comprises a set of data fields for storing a set of data values that allows an identical data value in the set of data values to be stored in different data fields of the set of data fields for the particular information object and the plurality of separate information objects. In particular embodiments, the method comprises: for each separate information object found in the plurality of separate information objects, combining the set of data values stored in the set of data fields for the separate information object to form a data structure comprising a data element for each data value found in the set of data values for the separate information object; combining the set of data values stored in the set of data fields for the particular information object to form a data structure comprising a data element for each data value found in the set of data values for the particular information object; and performing one or more iterations to determine whether the particular information object matches one or more of the plurality of separate information objects, wherein performing one of the one or more iterations comprises: performing a function on the data structure for the particular information object and the data structure for one of the plurality of separate information objects to identify an intersection comprising one or more data values in the set of data values for the particular information object that have identical matches with one or more data values in the set of data values for the one of the plurality of separate information objects; determining the particular information object is an exact match of the one of the plurality of separate information objects based at least in part on the intersection comprising each of the data values in the set of data values for the particular information object; determining the particular information object is a partial match of the one of the plurality of separate information objects based at least in part on the intersection having one or more of the data values in the set of data values for the particular information object, but less than all of the data values in the set of data values for the particular information object; and initiating an automated action based at least in part on determining the particular information object is at least one of the exact match and the partial match of the one of the plurality of separate information objects.

In accordance with another aspect of the present disclosure, an apparatus is provided for determining whether a particular information object is a duplicate of a separate information object found in a plurality of separate information objects in which the particular information object and each of the plurality of separate information objects comprises a set of data fields for storing a set of data values that allows an identical data value in the set of data values to be stored in different data fields of the set of data fields for the particular information object and the plurality of separate information objects. In particular embodiments, the apparatus comprises at least one processor and at least one memory including a computer program code. The at least one memory and the computer program code are configured to, with the at least one processor, cause the apparatus to: for each separate information object found in the plurality of separate information objects, combine the set of data values stored in the set of data fields for the separate information object to form a data structure comprising a data element for each data value found in the set of data values for the separate information object; combine the set of data values stored in the set of data fields for the particular information object to form a data structure comprising a data element for each data value found in the set of data values for the particular information object; and perform one or more iterations to determine whether the particular information object matches one or more of the plurality of separate information objects, wherein performing one of the one or more iterations comprises: performing a function on the data structure for the particular information object and the data structure for one of the plurality of separate information objects to identify an intersection comprising one or more data values in the set of data values for the particular information object that have identical matches with one or more data values in the set of data values for the one of the plurality of separate information objects; determining the particular information object is an exact match of the one of the plurality of separate information objects based at least in part on the intersection comprising each of the data values in the set of data values for the particular information object; determining the particular information object is a partial match of the one of the plurality of separate information objects based at least in part on the intersection having one or more of the data values in the set of data values for the particular information object, but less than all of the data values in the set of data values for the particular information object; and initiating an automated action based at least in part on determining the particular information object is at least one of the exact match and the partial match of the one of the plurality of separate information objects.

In accordance with another aspect of the present disclosure, a computer program product for determining whether a particular information object is a duplicate of a separate information object found in a plurality of separate information objects in which the particular information object and each of the plurality of separate information objects comprises a set of data fields for storing a set of data values that allows an identical data value in the set of data values to be stored in different data fields of the set of data fields for the particular information object and the plurality of separate information objects. In particular embodiments, the computer program product includes at least one non-transitory computer-readable storage medium comprising instructions stored therein. The instructions being configured to cause one or more processors to at least perform operations configured to: for each separate information object found in the plurality of separate information objects, combine the set of data values stored in the set of data fields for the separate information object to form a data structure comprising a data element for each data value found in the set of data values for the separate information object; combine the set of data values stored in the set of data fields for the particular information object to form a data structure comprising a data element for each data value found in the set of data values for the particular information object; and perform one or more iterations to determine whether the particular information object matches one or more of the plurality of separate information objects, wherein performing one of the one or more iterations comprises: performing a function on the data structure for the particular information object and the data structure for one of the plurality of separate information objects to identify an intersection comprising one or more data values in the set of data values for the particular information object that have identical matches with one or more data values in the set of data values for the one of the plurality of separate information objects; determining the particular information object is an exact match of the one of the plurality of separate information objects based at least in part on the intersection comprising each of the data values in the set of data values for the particular information object; determining the particular information object is a partial match of the one of the plurality of separate information objects based at least in part on the intersection having one or more of the data values in the set of data values for the particular information object, but less than all of the data values in the set of data values for the particular information object; and initiating an automated action based at least in part on determining the particular information object is at least one of the exact match and the partial match of the one of the plurality of separate information objects.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
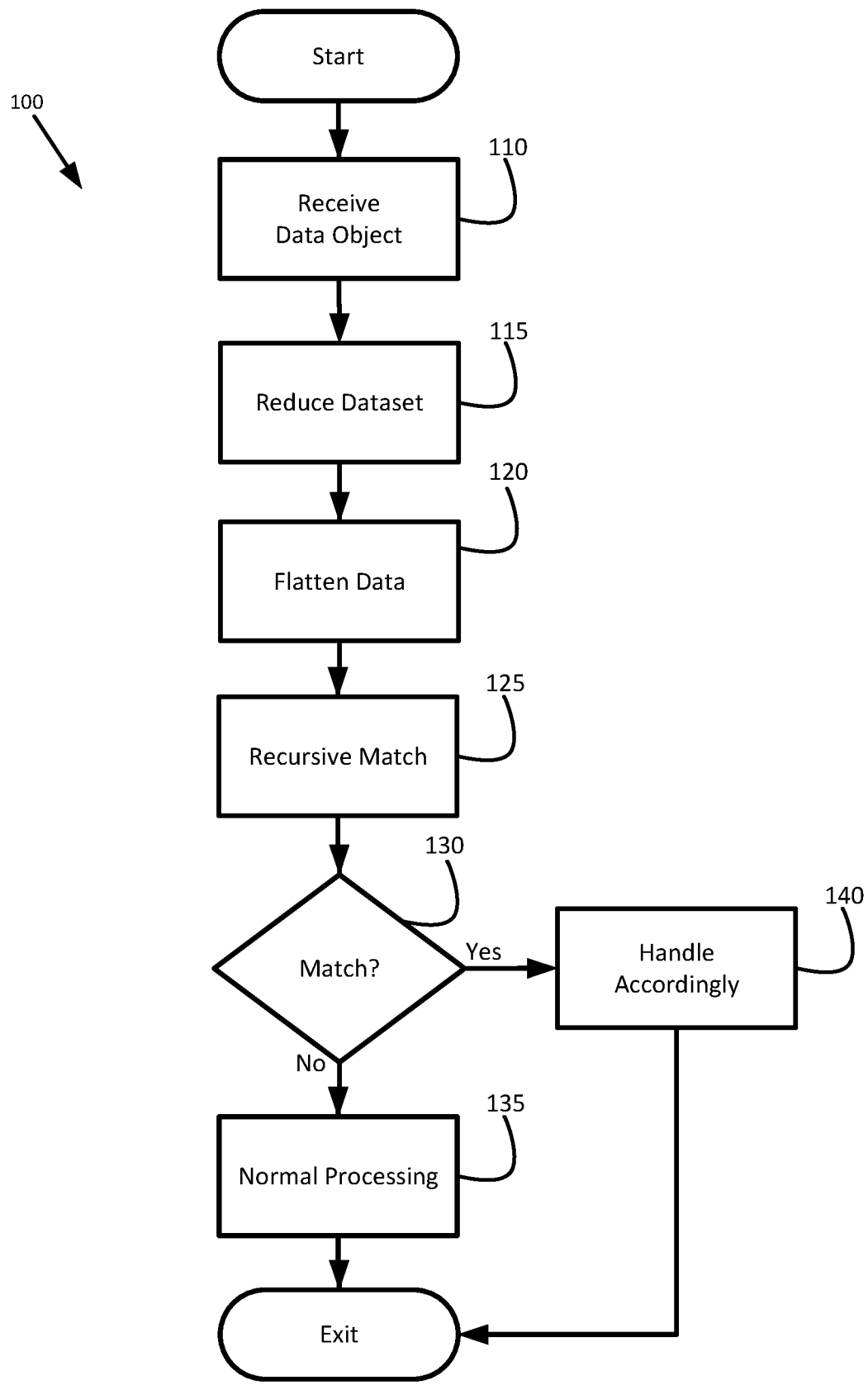
FIG. 1 is an overview process flow for identifying duplicates for a set of information objects in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "information object" may refer to a data object that represents an item on which an analysis is performed in various embodiments to identify whether the item is a duplicate. For instance, in particular embodiments, the information object may be an electronic record of an insurance claim used in conducting an analysis to determine whether the claim may be a duplicate of a claim previously submitted. While in other embodiments, the data information may be an electronic entry representing a component used in manufacturing that is placed in inventory and used in conducting an analysis to determine whether the component has already been counted as part of the inventory. Here, the information object may be associated with a set of information (e.g., data) that may be used in conducting the analysis. For example, the information object for an insurance claim may include information on the medical procedure for which the claim is being submitted, one or more diagnosis codes, one or more modifiers, as well as information on the party submitting the claim. While the information object for a component placed in inventory may include information recorded on the manufacturer of the component, the received date, part number, and/or tested properties of the component.

The term "data field" may refer to a data object that represents a position within an information object in which information (e.g., data) is stored. The data field may be configured to store specific information (e.g., a specific piece of data) or may be configured to store a variety of information depending on the data field. For example, a data field may be configured for an information object to specifically store the name of the manufacturer of a component. While in another example, a data field may be configured for an information object to store a variety of codes associated with an insurance claim.

The term "data value" may refer to the information stored in a data field of an information object. Accordingly, the data value may be various types of information such as, for example, numbers, text, audio files, images, pointers, and/or the like.

The term "intersection" may refer to a data object made up of a collection of data values that are common to two sets of data fields. As described further herein, an intersection is identified with respect to a set of data fields for two different information objects in determining whether one of the information objects is a duplicate of the other information object.

The term "function" may refer to a piece of computer programming code that performs a specific task. For instance, as discussed further herein, a function may be used in various embodiments to identify an intersection of data values for two different information objects.

The term "data structure" may refer to a data object facilitating the organization, management, and storage of data values that enables efficient access and modification. For instance, in some embodiments, the data structure is an array. An array is generally a collection of items (e.g., data values) stored at adjoining memory locations. The items can be stored together so that the position of each item of the array, referred to as an "element" of the array, can be retrieved and/or manipulated easily. In other embodiments, the data structure is a linked list. Like an array, a linked list stores a collection of items in a linear order. Here, each element of a linked list, referred to as a node, includes the item (e.g., data value) and a reference to the next node for the list. An advantage of a linked list over an array is that a linked list is a dynamic data structure while is an array is a static data structure. However, a disadvantage of a linked list is that such a data structure does not allow direct access to individual elements, while an array does. Thus, in various embodiments, a particular data structure may be preferred that allows functions to efficiently create and manipulate instances of the data structure.

The term "investigatory user interface" may refer to an interface provided on a computing device that can be used by individuals for viewing information objects for investigation due to the objects being identified as possible duplicates.

The term "insurance claim" may refer to a formal request by a policyholder to an insurance company for coverage or compensation for a covered loss or policy event. The insurance company validates the claim and, once approved, issues payment to the insured or an approved interested party on behalf of the insured. An example of processing information objects for various insurance claims to attempt to identify duplicate claims is used throughout the disclosure to demonstrate various embodiments of the invention.

The term "liability" may refer to something a person or company owes such as, for example, a sum of money. Liabilities may be settled over time through the transfer of economic benefits including money, goods, or services.

The term "claimant" may refer to a party making a claim under an insurance policy.

The term "insurance coverage" may refer to the amount of liability that is covered for an individual or entity by way of an insurance policy.

The term "medical procedure" may refer to a course of action intended to achieve a result in the delivery of healthcare. Accordingly, an insurance claim may be submitted by a claimant for a medical procedure performed by a healthcare provider for the claimant. For example, a medical procedure provided by a healthcare provider may be an x-ray and an insurance claim may be submitted to cover the cost of the x-ray.

Overview of Various Embodiments of the Invention

An overview is now provided to demonstrate various embodiments of the invention. With that said, an example is now described that is used throughout the disclosure to demonstrate various embodiments of the invention. This example is provided to assist the reader in understanding these embodiments and should not be construed to limit the scope of the inventions.

The healthcare insurance industry is forced to deal with enormous amounts of data that include items such as patient medical records, medication data, and insurance claims. There are numerous electronic formats used to transmit claims and thousands of different claims processing systems. Accordingly, a paperless system has been a goal of the US healthcare and the insurance industry for many years as such a system provides more efficient, and thus cheaper, data distribution, retrieval, search, and analysis. Healthcare EDI provides secure electronic data interchange between healthcare institutions, such as healthcare providers and insurance companies, and allows for more secure and efficient data processing, including healthcare claims processing.

The example provided herein involves an insurance company receiving and processing healthcare insurance claims for purposes of paying out benefits on the claims. The insurance company may process an information object with respect to each claim. For example, the information object may represent an EDI document received for a particular insurance claim. Here, the insurance company may wish to identify any duplicate claims that are submitted to eliminate discrepancies in paying out benefits on the claims. With that said, the number of claims received by the insurance company may be quite large, resulting in a large data set that may need to be analyzed to identify such duplicates.

In addition, various embodiments of the invention may be used in other environments that involve processing information objects representing items to identify duplicates in a set of the items. For example, various embodiments may be used to analyze information objects to identify duplicate purchase orders submitted by the customers of a seller. While in another example, various embodiments may be used to analyze information objects to identify duplicate inventory records for a manufacturing facility. Those of ordinary skill in the art can envision other environments in which embodiments of the inventions may be used in light of this disclosure.

Brief Overview of Technical Problem

Many industries make use of EDI to exchange electronic documents used in running their businesses. Such exchange of electronic documents can lead to a large volume of information being communicated between businesses that can result in duplication of information. Often times, identification of duplicates can be vital for a business to avoid unnecessary cost, as well as unnecessary use of limited resources such as the underlying computer systems used in processing EDI submissions. However, the structure of many EDI submissions can impede identifying duplicates. This is because many businesses may use their own formats for EDI submissions and may populate submissions differently with respect to each other. As a result, many businesses are required to use manual processes in identifying duplicates that can be time-consuming and error prone.

For example, an insurance company may need to implement effective duplicate claim identification to avoid unnecessary cost associated with paying out benefits incorrectly on claims. In many instances, the insurance claims are submitted by healthcare providers to the insurance company electronically. Here, the reasons that duplicate claim submissions can vary and are complicated by the way in which providers submit the information (e.g., the data) on the claims. This results in manual processes that can involve:

checking historical claim information to identify an exact match for an incoming claim to a historical claim; searching and checking membership to identify whether a claimant for a claim may have multiple coverage under another plan; adjusting historical claims where there is a change in Coordination of Benefits (COB) liability noted on a duplicate claim; and identifying and recovering of duplicate claims paid in error retrospectively. As noted, these investigations can be time-consuming and error prone due to the volume and variation in duplicate scenarios. The dependency on manual processes, often leading to multiple touchpoints both prospectively and retrospectively, can be quite costly for the insurance company, not only in errors produced by such manual processes resulting in overpayment of benefits on duplicate claims but also in the use of limited resources such as employees and systems in conducting these reviews.

It is noted that the technical problems associated with identifying duplicates from large sets of information (big data) is not limited to an EDI environment. Such problems can also exist in other environments that involve the processing of large sets of information that is not populated via EDI submissions. For example, an automotive manufacturer may store information on automobile production that is not gathered from a third-party using EDI. Instead, production information may be gathered by information entered manually by operators, as well as information submitted by automated assembly components used in manufacturing the automobiles. Here, the identification of duplicates with respect to automobile production may be critical with respect to the automotive manufacturer knowing the number of automobiles the manufacturer has built and are in inventory.

Brief Overview of Technical Solution

Embodiments of the present invention provide concepts for identifying duplicates for items represented by information objects by investigating a set of information objects for the items. In various embodiments, a data preparation is utilized to flatten information (e.g., data) found in a particular information object. In some embodiments, a set of data values stored in a set of data fields found in the information for the object are combined to form a data structure that includes a data element for each of the data values. For example, in particular embodiments, the set of data values are combined into an array that includes an element for each data value.

One or more iterations are then performed to determine whether the particular information object matches one or more of a plurality of separate information objects. An iteration involves performing a function on the data structure for the particular information object and the data structure for one of the plurality of separate information objects to identify an intersection that includes data values in the set of data values for the particular information object that have identical matches with data values in the set of data values for the separate information object. A determination may then be carried out on whether the particular information object is an exact match or a partial match of the separate information object. In some embodiments, the particular information object is determined to be an exact match if the intersection includes each of the data values in the set of data values for the particular information object. While in some embodiments, the particular information object is determined to be a partial match if the intersection includes one or more of the data values in the set of data values for the particular information object, but less than all of the values.

Accordingly, different automated processes may be carried out as a result of determining the particular information object is an exact or partial match of one of the separate information objects.

Various embodiments of the invention allow for the identification of duplicates of information objects that normally is handled by humans to be carried out in an automated fashion without human intervention. Here, embodiments facilitate recursive matching to identify exact and partial matches of information objects for various scenarios and multiple automated deployment strategies based at least in part on identifying exact and partial matches of such objects. Thus, the disclosed solution is more effective, accurate, less error prone, and faster than manual implementation. In addition, various embodiments' implementations reduce the manual effort necessary to identify and handle duplicates and reduces operational costs and inefficiencies.

Further, the data flattening techniques and comparison processes carried out in various embodiments to identify duplicate items (e.g., information objects) can carry out complex mathematical operations that cannot be performed by the human mind. Additionally, the solution can reduce the computational load of various systems used in processing information objects while marginally affecting the effective throughput of these systems. Accordingly, various embodiments of the present invention enhance the efficiency and speed of various systems used in processing information objects, provide the ability to verify information for a very large number of items (e.g., information objects), and make important contributions to the various computational tasks that utilize real-time/expediated processing of information objects.

Brief Overview of Various Embodiments

Turning now to FIG. 1, an overview process flow 100 is shown in accordance with various embodiments of the invention for identifying duplicates in a set of items (e.g., in a set of information objects). The process flow 100 is discussed with respect to the example involving identifying duplicate healthcare insurance claims received by an insurance company. A new insurance claim has been received in Step 110 that is represented by an information object (e.g., an electronic record). For instance, the electronic record for the new insurance claim has been received from a healthcare provider using EDI.

Here, the structure of the data found in the information object for the new claim complicates matching the new claim to an existing claim that was previously submitted (e.g., historical claim) to identify whether the new claim may be a duplicate or not. In this case, the issue relates to the diagnosis codes and accompanying modifiers. There can be up to twenty-five diagnosis codes found on a single claim, all held in individual positions (e.g., data fields) within the information object. In addition, multiple modifiers may be included on any given claim also contained in individual positions. These codes and modifiers can appear in different positions and/or can repeat across positions. As a result, matching the new claim to an existing claim is difficult.

In various embodiments, dataset reduction may be carried out initially as an optimization strategy in Step 115. Thus, a set of historical claims may be identified through selection of historical claims using some overlapping criteria. Next, in various embodiments, data preparation is carried out on the information object to flatten some of the data found within the information object for the new claim in Step 120. For instance, particular embodiments may involve applying a flattening technique to particular data values found within the information object to combine the data values into a data structure. Here, a data structure is used to organize, manage, and store the data values in a format that enables efficient access and manipulation of the values. For example, in some embodiments, the data is flattened by combining the individual data values found in the information object into an array. An array is a collection of elements at adjoining memory locations so that the position of each element can be manipulated and/or retrieved easily.

Figure 2:
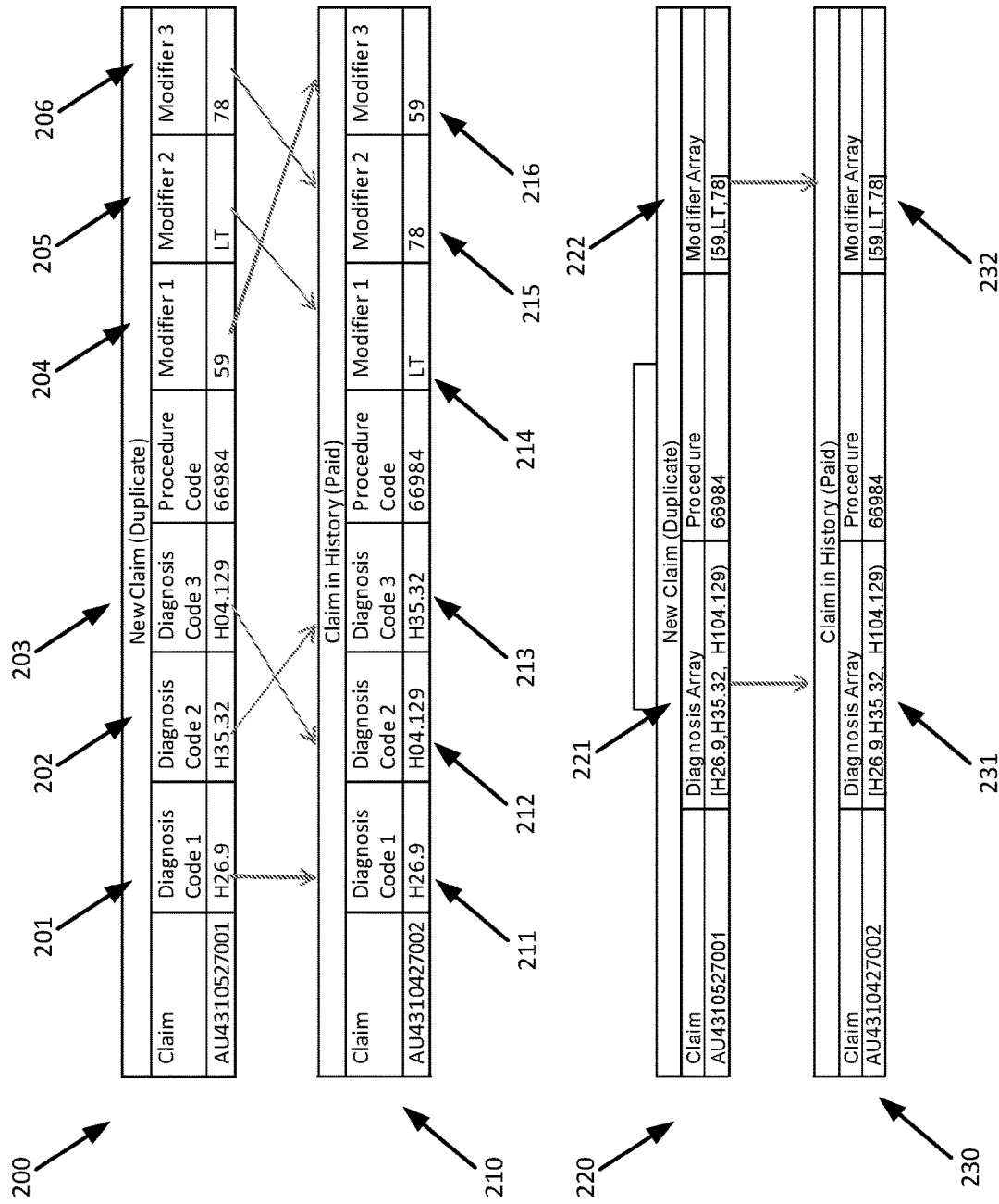
FIG. 2 is an example demonstrating the combining of data values found in an information object into a data structure in accordance with various embodiments of the present invention.

For example, turning briefly to FIG. 2, an information object 200 for the new insurance claim is shown that may include the diagnosis codes H26.9, H35.32, and H04.129. In addition, the object 200 may include the modifiers 59, LT, and 78. These codes and modifiers may have been entered into the information object 200 for the claim in no particular order and with respect to no particular position (field) for the object 200 except for the primary diagnosis code H26.9, which is placed in the first position 201. As for the remaining two diagnosis codes, diagnosis code H35.32 has been entered in the second code position 202 and the diagnosis code H04.129 has been entered in the third code position 203. However, these two codes could have been entered into these code positions 202, 203 in reverse order. Likewise, the modifier 59 may have been entered in the first modifier position 204, the modifier LT may have been entered in the second modifier position 205, and the modifier 78 may have been entered into the third modifier position 206.

The insurance company may wish to check to see whether the new insurance claim is a duplicate of a historical insurance claim that has already been paid. Here, in the information object 210 for the historical insurance claim, the primary diagnosis code H26.9 is in the first code position 211, the diagnosis code H04.129 is in the second code position 212, and the diagnosis code H35.32 is in the third code position 213. In addition, the object 210 for historical insurance claim has the modifier LT in the first modifier position 214, the modifier 78 in the second modifier position 215, and the modifier 59 in the third modifier position 216.

Therefore, if a comparison of the two information objects 200, 210 were to be carried out under a conventional process, each of the code positions 201, 202, 203 for the object 200 for the new insurance claim would need to be compared with each of the code positions 211, 212, 213 for the object 210 for the historical insurance claim to identify matches between the diagnosis codes for the two claims. Likewise, the same would need to be performed with respect to the modifier positions 204, 205, 206 for the object 200 for the new insurance claim and the modifier positions 214, 215, 216 for the object 210 for the historical insurance claim to identify matches between the modifiers for the two claims. Such a process can be quite computationally intensive and/or labor intensive depending on how the process is carried out in a conventional manner. Especially when the new insurance claim is to be compared to a large number of historical insurance claims to determine whether the new claim is a duplicate.

However, various embodiments of the invention address such issues by combining the data values (e.g., the diagnosis codes and modifiers) into one or more data structures that are more conducive to having the comparison carried out. Specifically, in particular embodiments, the information object 220 for the new insurance claim is modified by combining the diagnosis codes to form an array 221 with the elements of the array 221 being the diagnosis codes. In addition, the information object 220 for the new insurance claim is further modified by combining the modifiers to form an array 222 with the elements of the array 222 being the modifiers. Likewise, the information object 230 for the historical insurance claim is modified by combining the diagnosis codes and modifiers into arrays 231, 232, with the elements of the arrays 231, 232 being the diagnosis codes and modifiers, respectfully.

As described in further detail herein, a comparison may now be carried out on these arrays 221, 222, 231, 232 to identify which of the diagnosis codes and modifiers match between the two claims. Here, the arrays 221, 222, 231, 232 provide a data structure that allow for a comparison to be carried out that is more efficient than the comparison that is carried out under a conventional process. This is especially helpful when the new insurance claim needs to be compared to a large set of historical insurance claims to identify whether the new claim is a duplicate.

Other types of data structures may be used in other embodiments. For instance, particular embodiments of the invention may make use of a linked list to combine the data values for the information object instead of an array. A linked list stores a collection of elements in a linear order with each element, often referred to as a node, containing a data value and a reference or link to the next element for the list. The advantage of a linked list is this type of data structure is dynamic and thus, has the capability to grow and shrink in size, unlike an array. However, the disadvantage is a linked link does not allow for direct access to individual elements and therefore, the use of a linked list may result in slower computations with respect to the use of an array.

Therefore, returning to FIG. 1, the process flow 100 continues with carrying out a recursive match with respect to the modified information object 220 for the new insurance claim and the modified information object 230 for the historical insurance claim in Step 125. For instance, in particular embodiments, some type of function may be applied on the data structures 221, 222, 231, 232 for the modified information objects 220, 230 to form intersections having the data values that are identical between the data structures 221, 222, 231, 232. Specifically in the example, the function would be applied to the arrays 221, 231 having the diagnosis codes for both the new insurance claim and the historical insurance claim to form a first intersection, as well as applied to the arrays 222, 232 having the modifiers for both the new insurance claim and the historical insurance claim to form a second intersection. Accordingly, the array intersection function used in this instance allows automatic identification of the diagnosis codes and modifiers that are common to both the claims.

Depending on the embodiment, the comparison carried out on the two modified information objects 220, 230 for the two claims may identify whether there is an exact match, partial match, or no match. To find an exact match, all of the diagnosis codes and modifiers found in the new insurance claim must also be found in the historical insurance claim. Therefore, the intersections would need to contain all of the diagnosis codes and modifiers for the new claim. As for a partial match, the intersections would include some of the diagnosis codes and/or modifiers. Accordingly, the recursive matching process can be carried out between the new insurance claim and a number of historical insurance claims to evaluate whether the new claim is a duplicate of any of the historical insurance claims.

Once the new insurance claim has been evaluated with respect to the desired number of historical claims, the process flow 100 continues with determining whether a match was found for the new insurance claim in Step 130.

As mentioned, in particular embodiments, the determination may involve determining whether an exact match, a partial match, or no match was found for the new insurance claim with respect to the historical insurance claims. If no match was found, then the new insurance claim is allowed to process normally in Step 135 in particular embodiments. For example, the new insurance claim may be allowed to process normally so that the benefits on the claim are paid out.

However, if some type of match was found, then the new insurance claim is handled accordingly in Step 140. As further detailed herein, various types of processing may be applied with respect to the new insurance claim depending on whether an exact or partial match was found for the claim. For example, if an exact match was found for the claim, then the claim may be denied as a duplicate claim. While in another example, the claim may be further investigated to determine whether the claimant associated with the claim has additional insurance coverage that accounts for the duplicate claim. The same types of processes (actions) may be carried out on the new insurance claim if a partial match was found. In addition, many of these processes may be automated to partially or completely eliminate the need for human intervention. Thus, various embodiments of the invention provide a solution that is more cost-effective, accurate, and quicker than conventional human verification of duplicate insurance claims.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Computer Cluster Architecture

Figure 3:
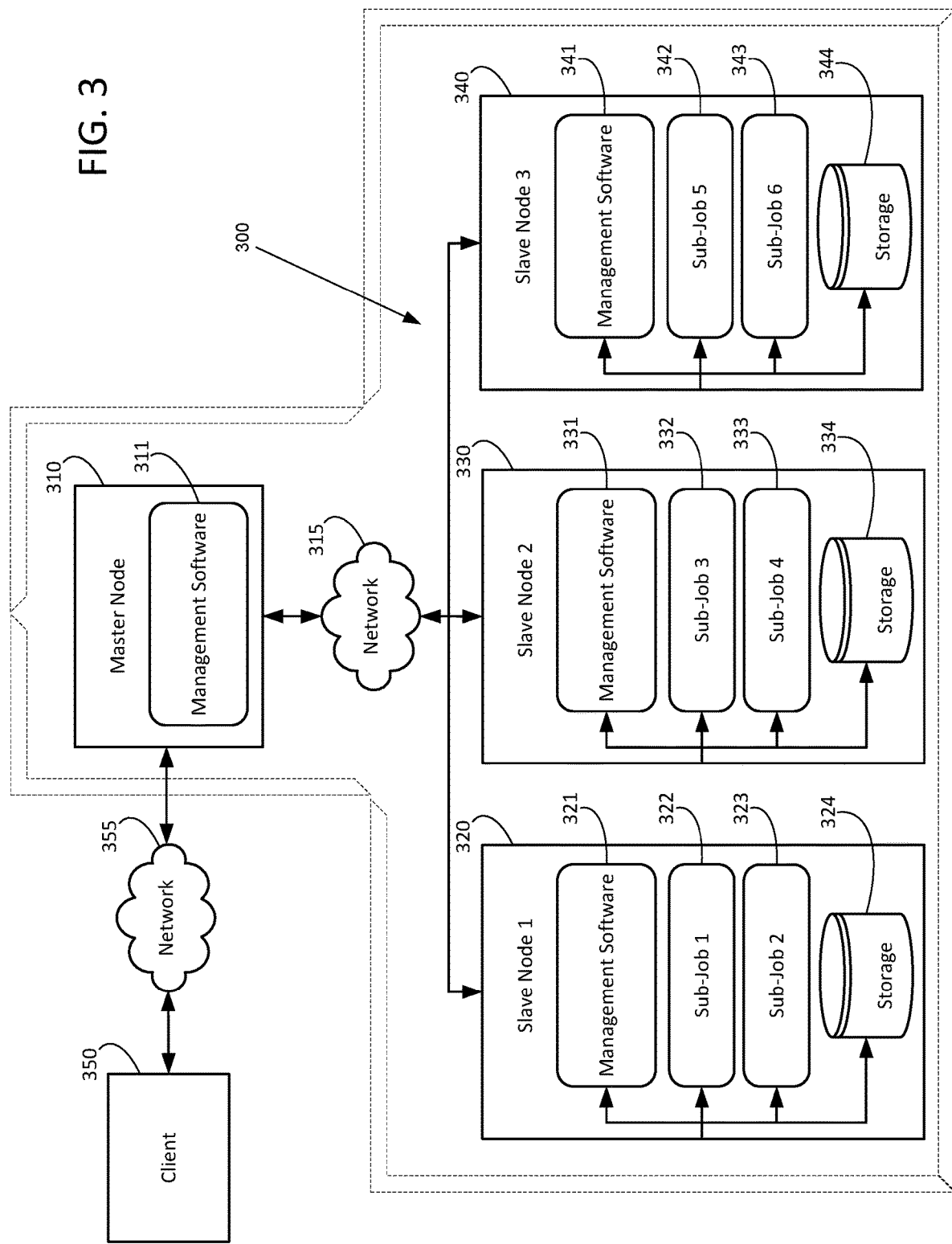
FIG. 3 is a diagram of a computer cluster architecture that can be used in conjunction with various embodiments of the present invention.

FIG. 3 provides a computer cluster architecture 300 (cluster) that may be used in accordance with various embodiments of the invention. Here, a cluster 300 may be utilized due to the volume of information objects that may be processed in various embodiments to identify duplicate objects. In other words, a cluster 300 may be used because the volume of information objects to be processed may be considered a "big data" processing application.

Accordingly, the cluster 300 includes a plurality of computer servers that are connected to each other over one or more networks 315. Depending on the embodiment, these networks 315 may comprise any type of known network such as a land area network (LAN), wireless land area network (WLAN), wide area network (WAN), metropolitan area network (MAN), wireless communication network, the Internet, and/or the like, or combinations thereof. In addition, these networks 315 may comprise any combination of standard communication technologies and protocols. For example, communications may be carried over the networks 315 by link technologies such as Ethernet, 802.11, CDMA, 3G, 4G, or digital subscriber line (DSL). Further, the networks 315 may support a plurality of networking protocols, including the hypertext transfer protocol (HTTP), the transmission control protocol/internet protocol (TCP/IP), or the file transfer protocol (FTP), and the data transferred over the networks 315 may be encrypted using technologies such as, for example, transport layer security (TLS), secure sockets layer (SSL), and internet protocol security (IPsec).

In this particular instance, the cluster 300 is made up of a master node 310 and one or more slave nodes 320, 330, 340. The master node 310 is configured to coordinate the activities of the slave nodes 320, 330, 340 and generally speaking, the computer hardware for the master node 310 and the slave nodes 320, 330, 340 are typically the same or similar, with the distinction being the assigned roles the servers plays within the cluster 300. In various embodiments, middleware software may be used to coordinate activities between the master node 310 and the slave nodes 320, 330, 340 so that the cluster 300 operates as a single cohesive computing unit. Accordingly, the master node 310 is configured to divide jobs and/or processes into smaller jobs and/or processes (e.g., sub jobs and/or sub-processes) to be carried out on the slave nodes 320, 330, 340 to have the jobs and/or processes executed quickly and efficiently.

In various embodiments, the duster 300 is configured to communication with a client 350 over a network 355. Again, depending on the embodiment, the network 355 may comprise any type of known network such as a land area network (LAN), wireless land area network (WLAN), wide area network (WAN), metropolitan area network (MAN), wireless communication network, the Internet, and/or the like, or combinations thereof. The client 350 may submit jobs to the master node 310 for processing on the cluster 300 and the master node 310 returns the job to the client 350 once it has been completed. Here, the master node 310 is configured to analyze a job submitted by the client 350 and divide the job into a plurality of sub jobs 322, 323, 332, 333, 342, 343 to be assigned and distributed to the various slave nodes 320, 330, 340 in the cluster 300. In particular embodiments, the master node 310 may be configured to utilize management software 311 for managing and/or tracking the sub jobs 322, 323, 332, 333, 342, 343 that have been distributed across the cluster 300. For example, the management software 311 may be implemented using a job tracker or Yarn resource manager found in a Hadoop system. In various embodiments, the slave nodes 320, 330, 340 also include software 321, 331, 341 for tracking the sub-jobs 322, 323, 332, 333, 342, 343 being processed by the nodes 320, 330, 340. In addition, the slave nodes 320, 330, 340 may include a storage device 324, 334, 344 to store data and/or software for processing the sub-jobs received from the master node 310.

Further, the master node 310 and/or slave nodes 320, 330, 340 may access a storage system (not shown) in which data (e.g., information objects) may be stored. Depending on the embodiment, the storage system can include one or more storage units, such as multiple distributed storage units that are connected through a computer network. Each storage unit in the storage system can store at least one of one or more data assets and/or one or more data about the computed properties of one or more data assets. Moreover, each storage unit in the storage system can include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. Here, the storage system may be in communication with the cluster 300 over one or more networks.

Exemplary Computing Entity

Figure 4:
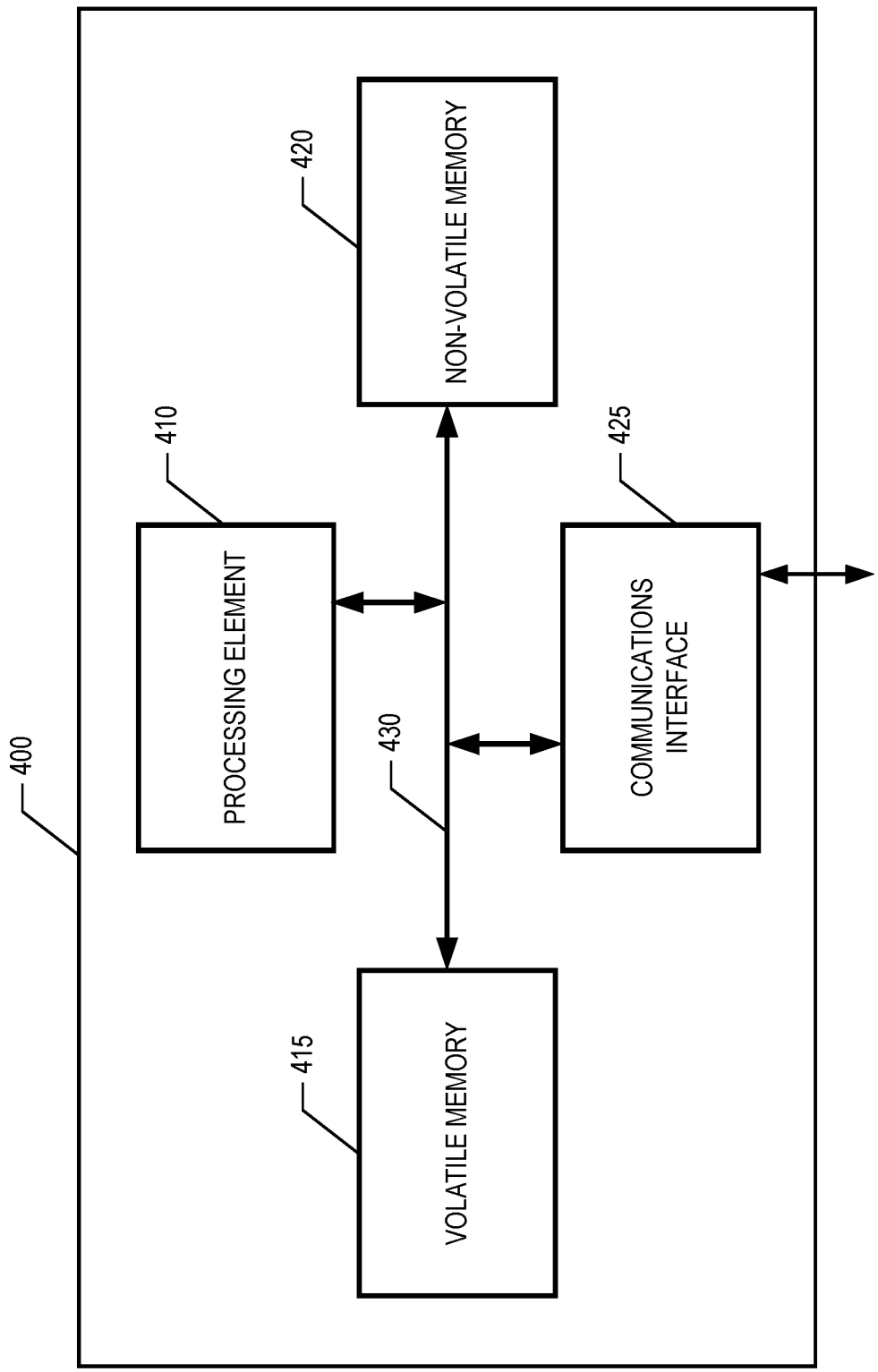
FIG. 4 is a schematic of a computing entity in accordance with various embodiments of the present invention.

FIG. 4 provides a schematic of a computing entity 400 according to various embodiments of the present invention. For instance, the computing entity 400 may be one or more of the master node 310, slave nodes 320, 330, 340, and/or client 350 found within the cluster architecture 300 previously described in FIG. 3. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 425 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 410 (also referred to as processors, processing circuitry, and/or similar terms used herein interchangeably) that communicate with other elements within the computing entity 400 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entirely hardware embodiment or a combination of hardware and computer program products. Thus, the processing element 410 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present invention when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 410 and operating system.

As will be appreciated, one or more of the computing entity's components may be located remotely from other computing entity components, such as in a distributed system. Furthermore, one or more of the components may be aggregated and additional components performing functions described herein may be included in the computing entity 400. Thus, the computing entity 400 can be adapted to accommodate a variety of needs and circumstances.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Processing Information Object Module

Figure 5:
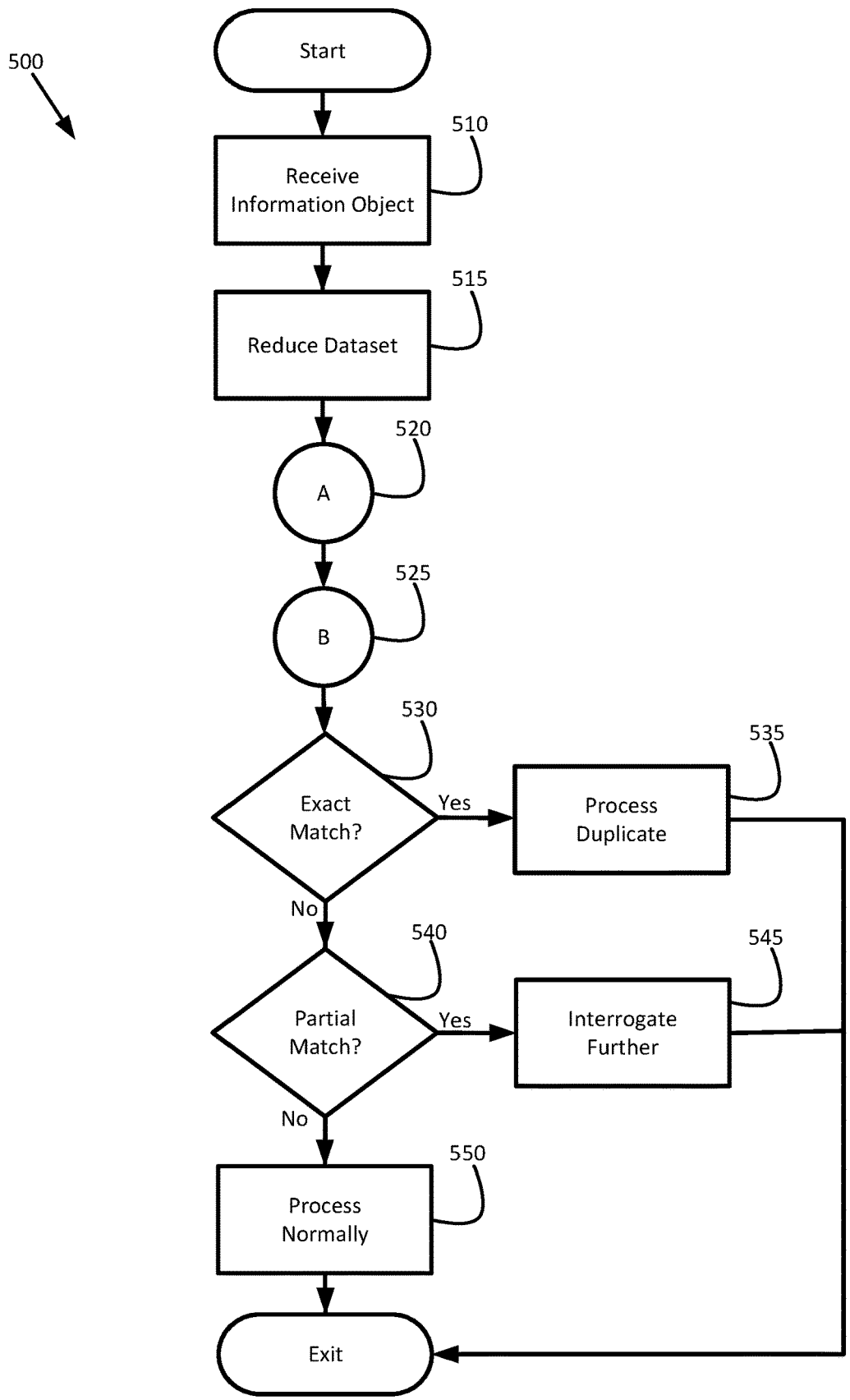
FIG. 5 is a process flow for processing a particular information object in accordance with various embodiments of the present invention.

Turning now to FIG. 5, additional details are provided regarding a process flow for processing an information object according to various embodiments. FIG. 5 is a flow diagram showing a processing information object module for performing such functionality according to various embodiments of the invention. For example, the flow diagram shown in FIG. 5 may correspond to operations carried out by a processing element 410 in one or more computing entities 400, such as the master node 310 and/or slave nodes 320, 330, 340 described in FIG. 3, as it executes the processing information object module stored in the computing entities' volatile and/or nonvolatile memory.

As with previous discussions, the process flow 500 shown in FIG. 5 will be described with respect to the example of determining whether a newly submitted insurance claim is a duplicate. The process flow 500 begins in various embodiments with the processing information object module receiving an information object representing the newly submitted insurance claim in Operation 510. For example, the information object may be a record of a new healthcare insurance claim submitted by a healthcare provider who provided the claimant with one or more medical procedures. Here, the insurance company is interested in determining whether the new claim may be a duplicate of a previously submitted claim for a service that has already been reimbursed and therefore, subject to overpayment.

Next, the processing information object module reduces the dataset of historical insurance claims as an optimization strategy in Step 515. In particular embodiments, the processing information object module performs this operation by identifying a set of historical insurance claims to consider using some overlapping criteria between the new insurance claim and the claims found in the set of historical insurance claims.

As previously discussed, the structure of the information (e.g., data) found within the information object for the newly submitted insurance claim complicates matching the new claim to previously submitted (historical) claims. Specifically, an insurance claim may have up to twenty-five diagnosis codes that may be entered by the healthcare provider for the claim. These codes may appear in individual positions (e.g., data fields) within the information object for the insurance claim. In addition, an insurance claim may have multiple modifiers that also appear in individual positions within the information object for the insurance claim. Accordingly, these diagnosis codes and modifiers may appear in different positions between information objects for different claims, as well as repeat across positions. Therefore, under conventional matching practices, matching would need to be conducted across the different positions causing a combinatorics problem.

Thus, various embodiments of the invention address this issue by combining the data values for a set of data fields, this instance the data fields for the diagnosis codes and the modifiers, into a data structure that is more conducive for conducting an analysis to determine whether the new insurance claim matches an existing insurance claim. Specifically, the processing information object module takes all of the diagnosis codes from the corresponding data fields and combines them into a data structure in Operation 520. The processing information object module also does the same with respect to the modifiers from their corresponding data fields.

Here, in particular embodiments, the processing information object module performs this operation by invoking a flattening data module. As discussed in further detail herein, the flattening data module uses one or more flattening techniques to combine the diagnosis codes into a first data structure and the modifiers into a second data structure. In turn, these data structures facilitate the organization, management, and storage of the diagnosis codes and modifiers that enables efficient access and modification of the codes and modifiers. For instance, in particular embodiments, the data structures are arrays.

Once the processing information object module has combined the data values into the data structure(s), the module conducts an analysis on the information object to identify a separate information object that may match the object in Operation 525. For instance, in the example, the processing information object module conducts an analysis to identify any historical insurance claims that may match the new insurance claim. In particular embodiments, the processing information object module performs the analysis by invoking a matching module. Accordingly, the matching module makes use of the data structures created for the information object in identifying any separate information objects that are an exact match or a partial match with the information object. As discussed further herein, in particular embodiments, the data structures facilitate the matching process by allowing for the process to be carried out for the particular information object and a large number of separate information objects.

An exact match may be determined based at least in part on all of the data values found in the one or more data structures for the information object having matches with data values found in the data structure(s) for a separate information object. In other words, in the example, an exact match may be determined to be found for the new insurance claim based at least in part on all of the diagnosis codes and modifiers found in the data structures for the new insurance claim having an identical match in the data structures for a historical insurance claim. While a partial match may be determined based at least in part on some of the data values found in the one or more data structures for the new insurance claim having matches with data values found in structure(s) for a historical insurance claim.

In particular embodiments, an exact match is considered to identify the particular information object to be a duplicate of a separate information object. Therefore, in these particular embodiments, the processing information object module may determine whether an exact match was made in Operation 530 and if so, the module may process the information object as a duplicate in Operation 535. For instance, returning to the example, the processing information object module may initiate an automated action such as automatically having the new insurance claim denied upon determining the new claim is an exact match for a historical insurance claim that has already been reimbursed. This may be facilitated through one or more APIs that enables the processing information object module to interact with various systems. Thus, various embodiments of the invention allow for a range of deployment approaches (actions) to be implemented to handle information objects that have been found to have an exact match. In addition, various embodiments allow for such deployment approaches to be automated to handle exact matches without manual intervention.

For instance, the processing information object module may be configured in some embodiments to identify whether the claimant for the new insurance claim may have additional health insurance coverage with the insurance company upon identifying an exact match for the new insurance claim. For example, members may hold both Medicare and Medicaid coverage administered by the insurance company. This may account for the duplicate insurance claim in some instances. Medicare typically pays first, with Medicaid paying on any remaining liability after Medicare has paid out. Therefore, in these instances, the processing information object module may be configured to have the paid amount on the Medicare instance of the claim used as the Coordination of Benefits (COB) payment amount on the Medicaid instance of the claim upon determining the claimant for the duplicate claims has both coverages.

In another instance, the processing information object module may be configured to identify false positives. For example, some medical procedures can be reimbursed more than once per day such as obstetrical claims that can appear under the mother's details when they are actually related to the baby, and ambulance claims that can utilize further data fields for duplicate information. Therefore, the processing information object module can be configured in particular embodiments to handle these specific situations upon identifying the new insurance claim as a duplicate. Again, the processing information object module's recognition of these situations may allow for the handling of these duplicate insurance claims to be automated, without the need for manual intervention.

If the processing information object module determines the information object is not an exact match, then the module determines whether the information object is a partial match in Operation 540. A partial match typically involves some of the data values found in the data structure(s) for the particular information object matching data values found in the data structure(s) for a separate information object. Therefore, in these instances, the information object may or may not necessarily be a duplicate. That is to say, in the example, the new insurance claim may or may not be a duplicate for a historical claim that has already been reimbursed.

Accordingly, the processing information object module may interrogate the information object further in Operation 545 upon determining the object is a partial match in various embodiments. Such interrogation may be carried out to determine whether in fact the particular information object is a duplicate. Again, various embodiments of the invention allow for a range of deployment approaches (actions) to be implemented to handle information objects that have been found to have a partial match. In addition, various embodiments allow for such deployment approaches to be automated to handle partial matches without manual intervention. The processing information object module may make use of one or more APIs to various systems to facilitate automation.

For instance, in particular embodiments, the processing information object module may be configured to perform particular operations for the information object based at least in part on the attributes of the object that are the same and/or different from the separate information object. For example, if all the diagnosis codes for the new insurance claim match the codes for a historical claim and the only difference is that not all of the modifiers match, then the processing information object module may be configured to process the new claim as a duplicate. While in other instances, the processing information object module may be configured to place the new insurance claim in a queue for review by personnel to resolve the discrepancy. Here, the personnel may review the queued insurance claims by reviewing their information objects using some type of computer display. Those of ordinary skill in the art can envision several approaches that may be implemented in various embodiments to handle both exact and partial matches in light of this disclosure.

Finally, if the processing information object module determines the information object is neither an exact nor partial match, then the module processes the information object normally in Operation 550. For instance, the processing information object module permits the new insurance claim to be processed as though it is not a duplicate claim, allowing for the claim to be reimbursed. Such a configuration allows for any claims found not to be duplicates to process normally without having to be reviewed manually. Instead, the only new insurance claims that may need to be reviewed are those that are found to be exact and/or partial matches. Thus, various embodiments of the invention allow for a reduced volume of new insurance claims that need to be manually reviewed to identify duplicate claims. That is to say, various embodiments of the invention provide a more cost-effective, accurate, and quicker than manual verification of duplicates.

Flattening Data Module

Figure 6:
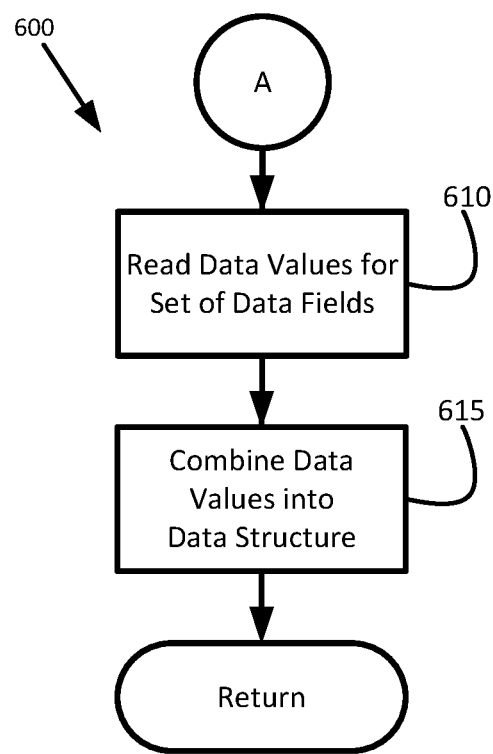
FIG. 6 is a process flow for combining a set of data values into a data structure in accordance with various embodiments of the present invention.

Turning now to FIG. 6, additional details are provided regarding a process flow for combining a set of data values into a data structure according to various embodiments. FIG. 6 is a flow diagram showing a flattening data module for performing such functionality according to various embodiments of the invention. For example, the flow diagram shown in FIG. 6 may correspond to operations carried out by a processing element 410 in one or more computing entities 400, such as the master node 310 and/or slave nodes 320, 330, 340 described in FIG. 3, as it executes the flattening data module stored in the computing entities' volatile and/or nonvolatile memory.

As previously mentioned, the flattening data module may be invoked by another module in various embodiments to combine a set of data values into a data structure for an information object. For instance, in particular embodiments, the flattening data module may be invoked by the processing information object module as previously described. However, with that said, the flattening data module may not necessarily be invoked by another module and may execute as a stand-alone module in other embodiments.

The process flow 600 begins with the flattening data module reading data values for a set of data fields found in the information object in Operation 610. Depending on the circumstances, the set of data fields may be configured to hold different types of data. However, in general, the data values stored across the set of fields may have some commonality with respect to each other. For example, the data values may be diagnosis codes for healthcare insurance claims. In addition, the data values may have some interest with respect to comparing the values for the information object with data values stored in a similar set of data fields for another information object.

Once the flattening data module has read the data values, the module combines the data values into a data structure in Operation 615. As previously discussed, the flattening data module combines the data values into a data structure that is more conducive to conducting a comparison of the data values for the object with the data values of another information object. For instance, in particular embodiments, the flattening data module combines the data values to form an array with the elements of the array being the data values. Other types of data structures may be used in other embodiments. For instance, particular embodiments of the invention may make use of a linked list to combine the data values for the information object instead of an array.

The flattening data module may be configured to combine data values for multiple sets of data fields in particular instances to produce multiple data structures. For example, the flattening data module is configured in some embodiments to combine the diagnosis codes stored in a first set of fields for an information object of an insurance claim into a first data structure and the modifiers stored in a second set of field for the information object into a second, different data structure. Such a configuration allows for more complex comparisons to be carried out across information objects.

Matching Module

Figure 7:
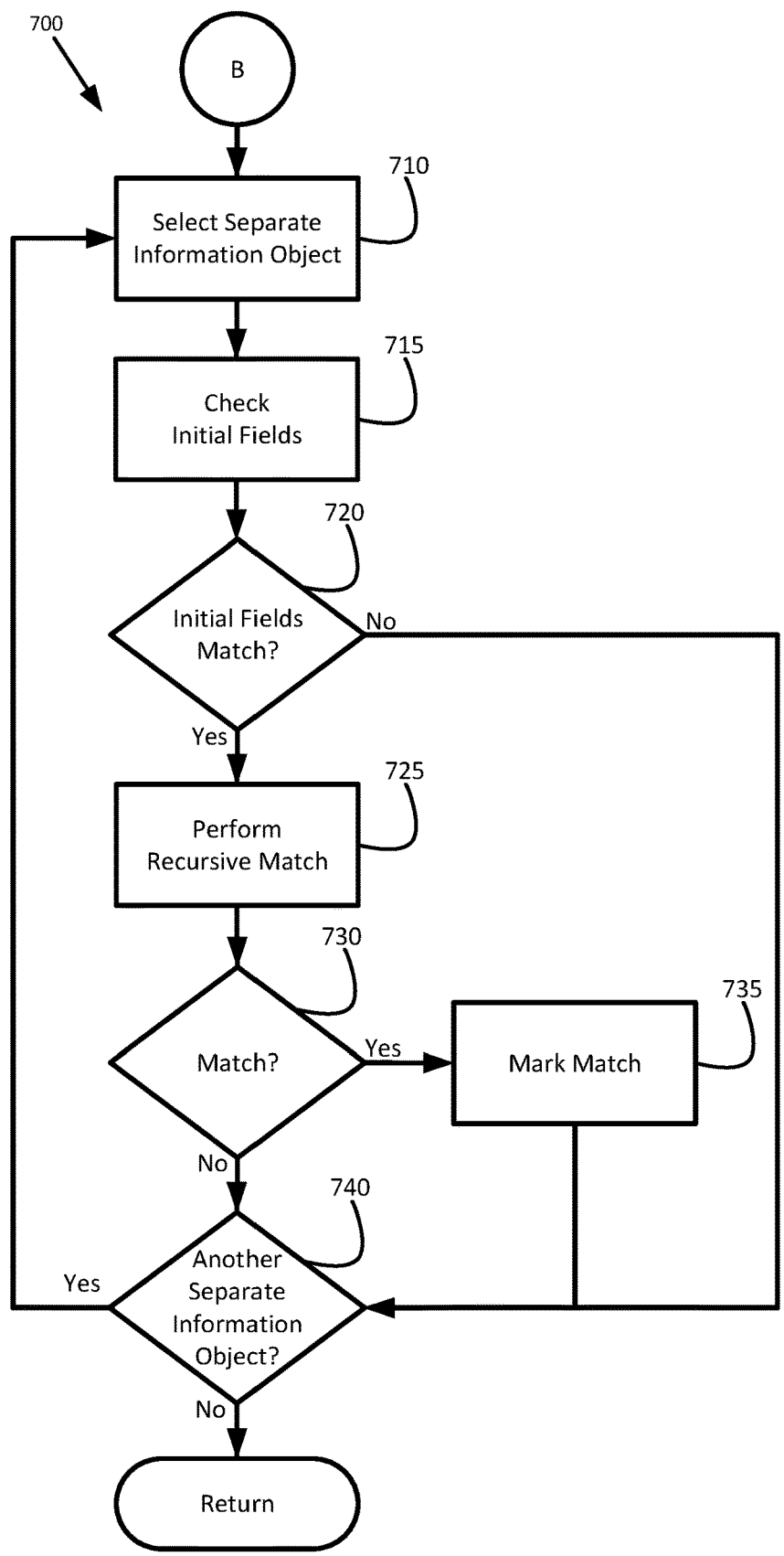
FIG. 7 is a process flow for identifying whether a particular information object is a duplicate in accordance with various embodiments of the present invention.

Turning now to FIG. 7, additional details are provided regarding a process flow for identifying whether an information object has a match according to various embodiments. FIG. 7 is a flow diagram showing a matching module for performing such functionality according to various embodiments of the invention. For example, the flow diagram shown in FIG. 7 may correspond to operations carried out by a processing element 410 in one or more computing entities 400, such as the master node 310 and/or slave nodes 320, 330, 340 described in FIG. 3, as it executes the matching module stored in the computing entities' volatile and/or nonvolatile memory.

As previously mentioned, the matching module may be invoked by another module in various embodiments to determine whether a match exists for an information object. For instance, in particular embodiments, the matching module may be invoked by the processing information object module as previously described. However, with that said, the matching module may not necessarily be invoked by another module and may execute as a stand-alone module in other embodiments.

The process flow 700 shown in FIG. 7 is configured to identify whether a particular information object matches one or more of a plurality of separate information objects. For example, the matching module may be configured to identify whether a new insurance claim is an exact match or a partial match with respect to a plurality of historical insurance claims. Thus, the process flow 700 begins with the matching module selecting a separate information object in Operation 710.

Here, the matching module is configured to check whether data values stored in an initial set of fields match between the two information objects in Operation 715. For example, the matching module may be configured to check whether the member identifier, national provider identifier, medical procedure code, and/or units of coverage for the new insurance claim match the same for the selected historical insurance claim. If the matching module determines the initial set of fields do not match between the information object and the separate information object in Operation 720, then the information object is not a duplicate of the separate information object. Accordingly, the matching module determines whether the information object needs to be compared with another separate information object in Operation 740. If so, then the module returns to Operation 710 and selects the next separate information object.

However, if the matching module determines the initial set of fields do match between the two objects in Operation 720, then the module carries out a recursive match with respect to the data structure(s) for the two information objects in Operation 725. In various embodiments, the matching module is configured to apply some type of function on the data structures for the two information objects to form one or more intersections having the data values that are identical between the data structures.

For instance, if the data structures are arrays in the example, then the matching module would apply some type of intersection function to the arrays having the diagnosis codes for both the new insurance claim and the historical insurance claim to form a first intersection, as well as apply the intersection function to the arrays having the modifiers for both the new insurance claim and the historical insurance claim to form a second intersection. Accordingly, the matching module determines whether the new insurance claim and the historical insurance claim are an exact or partial match based at least in part on the values included in the intersections. For instance, in particular embodiments, the module determines the two are an exact match if the two intersections include all of the diagnosis codes and modifiers for the new insurance claim. While in other embodiments, the module determines the two are an exact match if the two intersections include all of the diagnosis codes and modifiers for both the new insurance claim and the historical insurance claim.

The matching module may determine the new insurance claim and historical insurance claim are a partial match based at least in part on similar criteria. For example, the module may determine the two are a partial match if one of the intersections includes some diagnosis codes and/or modifiers for the new insurance claim. Here, the matching module may be configured in some embodiments to identify a "degree" of partial matching based at least in part on the number of similar data values (e.g., similar diagnosis codes and/or modifiers) between the two information objects.

At this point, the matching module determines whether a match was identified for the particular information object and separate information object in Operation 730. If so, then the matching module marks the match in Operation 735. Accordingly, in particular embodiments, the information object is then further processed based at least in part on the match. For example, the match may be reported back to the processing information object module previously discussed and the processing information object module has the particular information object processed accordingly based at least in part on whether an exact or partial match was identified for the information object.

The matching module then continues with determining whether the information object is to be compared to another separate information object in Operation 740. If so, then the module returns to Operation 710, selects the next separate information operation, and repeats the operations just discussed for the newly selected separate information object. Once the matching module has compared the information object to all of the separate information objects, the process flow 700 ends.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining whether a particular information object is a duplicate of a separate information object found in a plurality of separate information objects in which the particular information object and each of the plurality of separate information objects comprises a plurality of data fields for storing a plurality of data values associated with a plurality of data types that allows an identical data value in the plurality of data values to be stored in different data fields of the plurality of data fields for the particular information object and the plurality of separate information objects, the computer-implemented method comprising:

for each respective separate information object of the plurality of separate information objects, combining, based at least in part on the data type associated with each data value of the plurality of data types, one or more data values stored in the plurality of data fields for the respective separate information object to generate a flattened array data structure for the respective separate information object comprising a plurality of array data fields, wherein each array data field; (i) is associated with a unique data type of the plurality of data types and (ii) stores a subset of the plurality of data values that is associated with the unique data type of the array data field;

combining, based at least in part on the data type associated with each data value of the plurality of data types, one or more data values stored in the plurality of data fields for the particular information object to generate a flattened array data structure for the particular information object comprising a plurality of array data fields, wherein each array data field: (i) is associated with a unique data type of the plurality of data types and (ii) stores a subset of the plurality of data values that is associated with the unique data type of the array data field; and for each respective separate information object;

performing an array intersection identification operation on the flattened array data structure for the particular information object and the flattened array data structure for the respective separate information object to generate, for each data type, a flattened array intersection comprising one or more data values in a corresponding array data field of the flattened array data structure for the particular information object that have identical matches in a corresponding array data field of the flattened array data structure for the respective separate information object;

determining whether the particular information object is an exact match of the respective separate information object if each flattened array intersection comprises all of the one or more data values of the corresponding array data field for the particular information object;

determining whether the particular information object is a partial match of the respective separate information object if each flattened array intersection comprises a non-holistic subset of the one or more data values of the corresponding array data field whose ration exceeds a required partial matching degree; and initiating an automated action based at least in part on whether the particular information object is the exact match of the respective separate information object and whether the particular information object is the partial match of the respective separate information object.

2. The computer-implemented method of claim 1, wherein the data structure for the particular information object comprises at least one of an array or a linked list.

3. The computer-implemented method of claim 1, wherein determining the particular information object is at least one of the exact match or the partial match of the one of the plurality of separate information objects further comprises determining data values stored in one or more additional data fields not found in the set of data fields for the particular information object match data values stored in one or more additional data fields not found in the set of data fields for the one of the plurality of separate information objects.

4. The computer-implemented method of claim 1, wherein upon determining the particular information object is the partial match of the one of the plurality of separate information objects, the automated action comprises having the particular information object identified as the partial match of the one of the plurality of separate information objects on an investigatory user interface.

5. The computer-implemented method of claim 1, wherein the particular information object represents a particular insurance claim and the plurality of separate information objects represent a plurality of historical insurance claims, and upon determining the particular information object is the exact match of the one of the plurality of separate information objects, the automated action comprises having the particular insurance claim denied.

6. The computer-implemented method of claim 1, wherein the particular information object represents a particular insurance claim and the plurality of separate information objects represent a plurality of historical insurance claims, and upon determining the particular information object is the exact match of the one of the plurality of separate information objects, the automated action comprises:
   determining whether a claimant for the particular insurance claim has additional insurance coverage; and
   adjusting the liability on the historical insurance claim represented by the one of the plurality of separate information objects based at least in part on the claimant having the additional insurance coverage.

7. The computer-implemented method of claim 1, wherein the particular information object represents a particular insurance claim and the plurality of separate information objects represent a plurality of historical insurance claims, and upon determining the particular information object is the exact match of the one of the plurality of separate information objects, the automated action comprises determining whether a medical procedure associated with the particular insurance claim is a type of medical procedure that can be reimbursed more than once a day.

8. The computer-implemented method of claim 1, wherein the particular information object represents a particular insurance claim and the plurality of separate information objects represent a plurality of historical insurance claims, and the computer-implemented method further comprises allowing the particular insurance claim to be processed normally in response to the particular information object not being an exact match or a partial match with any one of the plurality of separate information objects.

9. An apparatus for determining whether a particular information object is a duplicate of a separate information object found in a plurality of separate information objects in which the particular information object and each of the plurality of separate information objects comprises a plurality of data fields for storing a plurality of data values associated with a plurality of data types that allows an identical data value in the plurality of data values to be stored in different data fields of the plurality of data fields for the particular information object and the plurality of separate information objects, the apparatus comprising:
   at least one processor; and
   at least one memory including stored therein executable computer program code, the at least one memory and the executable computer program code configured to, with execution of the computer program code by the at least one processor,
cause the apparatus to:
   for each respective separate information object of the plurality of separate information objects, combining, based at least in part on the data type associated with each data value of the plurality of data types, one or more data values stored in the plurality of data fields for the respective separate information object to generate a flattened array data structure for the respective separate information object comprising a plurality of array data fields, wherein each array data field: (i) is associated with a unique data type of the plurality of data types and (ii) stores a subset of the plurality of data values that is associated with the unique data type of the array data field;
   combine, based at least in part on the data type associated with the each data value of the plurality of data types, one or more data values stored in the plurality of data fields for the particular information object to generate a flattened array data structure for the particular information object comprising a plurality of array data fields, where each array data field: (i) is associated with a unique data type of the plurality of data types and (ii) stores a subset of the plurality of data values that is associated with the unique data type of the array data field; and
   for each respective separate information object:
      performing an array intersection identification operation on the flattened array data structure for the particular information object and the flattened array data structure for the respective separate information object to generate, for each data type, a flattened array intersection comprising one or more data values in a corresponding array data field of the flattened array data structure for the particular information object that have identical matches in a corresponding array data field of the flattened array data structure for the respective separate information object;
      determining whether the particular information object is an exact match of the respective separate information object if each flattened array intersection comprises all of the one or more data values of the corresponding array data field for the particular information object;
      determining whether the particular information object is a partial match of the respective separate information object if each flattened array intersection comprises a non-holistic subset of the one or more data values of the corresponding array data field whose ration exceeds a required partial matching degree; and
      initiating an automated action based at least in part on whether the particular information object is the exact match of the respective separate information object and whether the particular information object is the partial match of the respective separate information object.

10. The apparatus of claim 9, wherein the data structure for the particular information object comprises a one-dimensional array.

11. The apparatus of claim 9, wherein the at least one memory and the computer program code are configured to, with the at least one processor, cause the apparatus to determine the particular information object is at least one of the exact match or the partial match of the one of the plurality of separate information objects by determining data values stored in one or more additional data fields not found in the set of data fields for the particular information object match data values stored in one or more additional data fields not found in the set of data fields for the one of the plurality of separate information objects.

12. The apparatus of claim 9, wherein upon determining the particular information object is the partial match of the one of the plurality of separate information objects, the automated action comprises having the particular information object identified as the partial match of the one of the plurality of separate information objects on an investigatory user interface.

13. The apparatus of claim 9, wherein the particular information object represents a particular insurance claim and the plurality of separate information objects represent a plurality of historical insurance claims, and upon determining the particular information object is the exact match of the one of the plurality of separate information objects, the automated action comprises having the particular insurance claim denied.

14. The apparatus of claim 9, wherein the particular information object represents a particular insurance claim and the plurality of separate information objects represent a plurality of historical insurance claims, and upon determining the particular information object is the exact match of the one of the plurality of separate information objects, the automated action comprises:
   determining whether a claimant for the particular insurance claim has additional insurance coverage; and
   adjusting the liability on the historical insurance claim represented by the one of the plurality of separate information objects based at least in part on the claimant having the additional insurance coverage.

15. The apparatus of claim 9, wherein the particular information object represents a particular insurance claim and the plurality of separate information objects represent a plurality of historical insurance claims, and upon determining the particular information object is the exact match of the one of the plurality of separate information objects, the automated action comprises determining whether a medical procedure associated with the particular insurance claim is a type of medical procedure that can be reimbursed more than once a day.

16. The apparatus of claim 9, wherein the particular information object represents a particular insurance claim and the plurality of separate information objects represent a plurality of historical insurance claims, and the at least one memory and the computer program code are configured to, with the at least one processor, cause the apparatus to allow the particular insurance claim to be processed normally in response to the particular information object not being an exact match or a partial match with any one of the plurality of separate information objects.

17. A non-transitory computer-readable storage medium comprising instructions for determining whether a particular information object is a duplicate of a separate information object found in a plurality of separate information objects in which the particular information object and each of the plurality of separate information objects comprises a plurality of data fields for storing a plurality of data values associated with a plurality of data types that allows an identical data value in the plurality of data values to be stored in different data fields of the plurality of data fields for the particular information object and the plurality of separate information objects, the instructions being configured to be executed by one or more processors to at least perform operations configured to:
   for each respective separate information object of the plurality of separate information objects, combining, based at least in part on the data type associated with each data value of the plurality of data types, one or more data values stored in the plurality of data fields for the respective separate information object to generate a flattened array data structure for the respective separate information object comprising a plurality of array data fields, wherein each array data field; (i) is associated with a unique data type of the plurality of data types and (ii) stores a subset of the plurality of data values that is associated with the unique data type of the array data field;
   combine, based at least in part on the data type associated with each value of the plurality of data types, one or more data values stored in the plurality of data fields for the particular information object to generate a flattened array data structure for the particular information object comprising a plurality of array data fields, wherein each array data field: (i) is associated with a unique data, type of the plurality of data types and (ii) stores a subset of the plurality of data values that is associated with the unique data type of the array data field; and
   for each respective separate information object;
      performing an array intersection identification operation on the flattened array data structure for the particular information object and the flattened array data structure for the respective separate information object to generate, for each data type, a flattened array intersection comprising one or more data values in a corresponding array data field of the flattened array data structure for the particular information object that have identical matches in a corresponding array data field of the flattened array data structure for the respective separate information object;
      determining whether the particular information object is an exact match of the respective separate information object each flattened array intersection comprises all of the one or more data values of the corresponding array data field for the particular information object;
      determining whether the particular information object is a partial match of the respective separate information object if each flattened array intersection comprises a non-holistic Subset of the one or more data values of the corresponding array data field whose ratio exceeds a required partial matching degree; and
      initiating an automated action based at least in part on whether the particular information object is the exact match of the respective separate information object and whether the particular information object is the partial match of the respective separate information object.

18. The non-transitory computer storage medium of claim 17, wherein the data structure for the particular information object comprises a one-dimensional array.

19. The non-transitory computer storage medium of claim 17, wherein the instructions are configured to cause the one or more processors to at least perform operations configured to determine the particular information object is at least one of the exact match or the partial match of the one of the plurality of separate information objects by determining data values stored in one or more additional data fields not found in the set of data fields for the particular information object match data values stored in one or more additional data fields not found in the set of data fields for the one of the plurality of separate information objects.

20. The non-transitory computer storage medium of claim 17, wherein upon determining the particular information object is the partial match of the one of the plurality of separate information objects, the automated action comprises having the particular information object identified as the partial match of the one of the plurality of separate information objects on an investigatory user interface.

21. The non-transitory computer storage medium of claim 17, wherein the particular information object represents a particular insurance claim and the plurality of separate information objects represent a plurality of historical insurance claims, and upon determining the particular information object is the exact match of the one of the plurality of separate information objects, the automated action comprises having the particular insurance claim denied.

22. The non-transitory computer storage medium of claim 17, wherein the particular information object represents a particular insurance claim and the plurality of separate information objects represent a plurality of historical insurance claims, and upon determining the particular information object is the exact match of the one of the plurality of separate information objects, the automated action comprises:
  determining whether a claimant for the particular insurance claim has additional insurance coverage; and
  adjusting the liability on the historical insurance claim represented by the one of the plurality of separate information objects based at least in part on the claimant having the additional insurance coverage.

23. The non-transitory computer storage medium of claim 17, wherein the particular information object represents a particular insurance claim and the plurality of separate information objects represent a plurality of historical insurance claims, and upon determining the particular information object is the exact match of the one of the plurality of separate information objects, the automated action comprises determining whether a medical procedure associated with the particular insurance claim is a type of medical procedure that can be reimbursed more than once a day.

24. The non-transitory computer storage medium of claim 17, wherein the particular information object represents a particular insurance claim and the plurality of separate information objects represent a plurality of historical insurance claims, and the instructions are configured to cause the one or more processors to at least perform operations configured to allow the particular insurance claim to be processed normally in response to the particular information object not being an exact match or a partial match with any one of the plurality of separate information objects.

* * * * *

UNITED STATES PATENT AND TRADEMARK OFFICE
CERTIFICATE OF CORRECTION

PATENT NO. : 11,443,387 B2
APPLICATION NO. : 17/030531
DATED : September 13, 2022
INVENTOR(S) : Browne et al.

Page 1 of 1

It is certified that error appears in the above-identified patent and that said Letters Patent is hereby corrected as shown below:

In the Claims

Column 26
Line 59, "ration" should read --ratio--

Column 28
Line 27, "with the each data value of the plurality of data types," should read --with each data value of the plurality of data types--
Line 32, "where" should read --wherein--
Line 61, "ration" should read --ratio--

Column 30
Line 27, "with each value" should read --with each data value--
Line 51, "information object each" should read --information object if each--

Signed and Sealed this
Eleventh Day of October, 2022

Katherine Kelly Vidal
*Director of the United States Patent and Trademark Office*